United States Patent Office 3,267,071

Patented August 16, 1966

3,267,071

POLYOLEFINS STABILIZED BY ESTERS OF HYDROXYALKYL SULFIDES AND PHENOLIC COMPOUNDS

Jan van Schooten and Willem F. de Wit, Amsterdam, Netherlands, assignors to Shell Oil Company, New York, N.Y., a corporation of Delaware No Drawing. Filed Mar. 14, 1963, Ser. No. 265,066
Claims priority, application Netherlands, Mar. 26, 1962, 276,390
4 Claims. (Cl. 260—45.85)

The present invention relates to stabilized polymers or copolymers of olefinically unsaturated hydrocarbons. More particularly, the invention relates to polymers and copolymers of monoolefins such as ethylene, propylene and butenes which have been obtained by the use of metal compounds, and particularly those polymers which have been prepared at pressures of less than 100 atmospheres using the so-called Ziegler catalysts.

Specifically, the present invention provides new and useful stabilized solid polymers of the above-noted olefins which comprises the said solid polyolefin combined with an inhibitor combination consisting essentially of (1) a hydroxylalkyl sulfide havng a molecular weight greater than 200 and having the general formula:

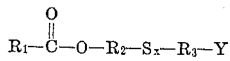

wherein $x$ is an integer having a value of from 1 to 3, and Y is selected from the group consisting of hydrogen, $R_4$,

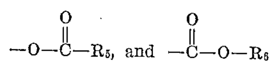

groups, in which $R_1$, $R_2$, $R_3$, $R_4$, $R_5$ and $R_6$ represent hydrocarbon groups or hydroxylated hydrocarbon groups and the $R_2$ group is an uninterrupted chain of at least 3 aliphatic and/or cycloaliphatic carbon atoms and $R_4$ may contain one or more carbon chains interrupted by one or more sulfur and/or oxygen atoms and (2) a phenolic compound.

The polymers which are stabilized according to this invention are porduced by polymerizing propylene or other suitable olefins by contact with a highly stereospecific catalyst system. A great variety of stereospecific catalysts have been described in the literature. They are generally species or modifications of the so-called Ziegler catalysts or Natta catalysts.

The Ziegler type catalysts may be designated "metal alkyl-reducible metal halide type," and the Natta type catalysts "preformed metal subhalide type." This terminology is used, for example, in "Polyolefin Resin Processes" by Marshall Sittig, Gulf Publishing Company, Houston, Texas, 1961. These well-known catalysts are the reaction products of halides, in order of preference chlorides and bromides, of transition metals from subgroups *b* of groups 4 and 5 of the Mendeleeff Periodic Table, as illustrated on page 28 of Ephraim, "Inorganic Chemistry," 6th English Edition, i.e., of Ti, Zr, Hf, Tl, V, Nb or Ta, with organo-metallic reducing agents in which the metal is from groups 1, 2 or 3. Preferred reducing agents are organoaluminum compounds and particularly aluminum alkyls, including aluminum alkyl halides. The most effective catalysts for the production of isotactic polypropylene known to date are those prepared from certain forms of titanium trichloride and certain aluminum alkyls and aluminum alkyl halides.

In the production of crystallizable alpha-olefin polymers, the reaction mixture formed in the low pressure polymerization is treated to deactivate the catalyst, usually by contact with a polar compound such as an alcohol and/or hydrochloric acid, and is subsequently washed for removal of at least a substantial portion of the catalyst residue. The resulting polymer almost invariably contains at least traces of the catalyst residue. Typically it may contain 50 to 500 parts per million (p.p.m.) of each of the catalyst components, calculated as the corresponding metal. A carefully purified polymer may contain as little as 10 p.p.m. of each metal or less. In order for the additives of this invention to be fully effective the polymer should contain at least 50 p.p.m. of the residue of at least one of the catalyst components, calculated as the corresponding metal.

Certain derivatives of thiodiglycol such as the di- and monododecanoyl and the di- and monooctadecanoyl derivatives thereof have been proposed as stabilizers for such polyolefins. It has now been found that when certain related thio-esters are used in combination with certain phenolic stabilizers in polyolefins, such olefin polymers have an unexpectedly high resistance to oxidation.

It is therefore a principal object of the present invention to provide polyolefin polymers which have improved resistance to oxidation. Other objects of the invention will become evident to those skilled in the art from the disclosure.

The process for stabilizing the polyolefin polymers comprises simply incorporating the stabilizer combination comprising one or more of the esters of hydroxyalkyl sulfides and one or more phenolic stabilizers into the polymer.

The hydroxyalkyl sulfide esters which are useful in the present invention are those esters having a molecular weight of more than 200 and may be represented by the general formula

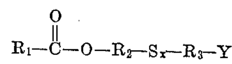

wherein $x$ is equal to 1, 2 or 3 and Y represents a hydrogen atom, a group $R_4$, a group

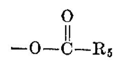

or a group

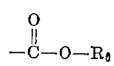

where all the symbols R represent hydrocarbon groups or hydroxylated hydrocarbon groups, the $$R_1-\overset{\overset{\displaystyle O}{\|}}{C}-O$$

group is attached to $S_x$ by an uninterrupted chain of at least three aliphatic and/or cycloaliphatic carbon atoms and $R_4$ may contain one or more carbon chains interrupted by one or more sulfur and/or oxygen atoms.

The groups $R_1$, $R_5$, and $R_6$ are generally acyclic aliphatic unbranched or branched groups having 8–30 carbon atoms, but may also have a cycloaliphatic or aromatic character.

The esters may be di- and trisulfides as well as monosulfides.

Esters of hydroxyalkyl sulfides that correspond with the above-mentioned formula and have a molecular weight of more than 400 are preferred in the process according to the invention.

Particularly suitable esters are those of the described type in whose formula the chain linking the $$R_1-\overset{\overset{\large O}{\|}}{C}-O$$

group with $S_x$ is an uninterrupted chain of 3–5 aliphatic and/or cycloaliphatic carbon atoms.

Other esters which may be especially recommended are those with a formula in which $S_x$ is linked to Y by an uninterrupted chain of at least 3 and preferably 3–5 aliphatic and/or cycloaliphatic carbon atoms, such as, for example, esters with the formula:

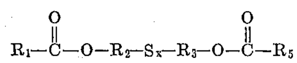

wherein $R_3$ is equal to $R_2$ and $R_5$ is equal to $R_1$, and wherein $R_2$ and $R_3$ are acyclic or cycloaliphatic radicals having from 3 to 5 carbon atoms and $R_1$ and $R_5$ are acyclic aliphatic radicals having from 8 to 30 carbon atoms. Preference is especially given to the diesters derived from aliphatic monocarboxylic acids with 8–30 carbon atoms. Examples of such esters are the diesters of these acids and bis(gamma-hydroxypropyl) monosulfide, bis(beta, gamma-dihydroxypropyl) monosulfide, bis-(delta-hydroxybutyl) monosulfide, bis(delta, gamma-dihydroxybutyl) monosulfide or the corresponding bis(hydroxyalkyl) di- and trisulfides.

Particularly favorable results are obtained by applying di-esters of bis(beta,gamma-dihydroxypropyl) monosulfide, only the gamma-hydroxyl groups are esterified, preferably with branched monocarboxylic acids having more than 8 carbon atoms, as, for example, saturated aliphatic monocarboxylic acids with more than 10 carbon atoms, in which the carboxyl groups are linked to tertiary and/or quaternary carbon atoms. Such monocarboxylic acids branched at the alpha-position can be obtained by the reaction of formic acid or of carbon monoxide and water, with olefins under the influence of liquid acid catalysts, such as sulfuric acid, phosphoric acid or complex compounds of phosphoric acid, boron trifluoride and water. Such monocarboxylic acids can also be prepared under the influence of the catalysts just mentioned by the reaction of formic acid or of carbon monoxide and water with paraffins if hydrogen acceptors are also present. The hydrogen acceptors may be olefins and also compounds from which olefins are readily formed, as, for instance, alcohols and alkyl halides. Furthermore, monocarboxylic acids branched at the alpha-position can be obtained by Reppe's method. Of particular value are the acids from monoolefins with 8–18 carbon atoms. Preferably, the base materials are mixtures of olefins obtained by cracking paraffinic hydrocarbons, for instance mineral oil fractions. In these mixtures branched and unbranched acyclic olefins as well as cycloaliphatic olefins may be present. By reaction with formic acid or with carbon monoxide and water, one obtains from them a mixture of saturated acyclic and cycloaliphatic monocarboxylic acids.

The afore-mentioned di-esters, which still contain a hydroxyl group in the beta-positions relative to the sulfur atoms, may be prepared by first esterifying epichlorohydrin and then condensing the resultant ester with $H_2S$.

The phenolic antioxidants that are applied in the compositions of the invention together with the hydroxyalkyl sulfide esters, may be various phenolic compounds that have an antioxidant effect. They may contain one or more phenolic OH groups and one or more aryl nuclei, of which nuclei, one, or generally more than one hydrogen atom has been replaced by a hydrocarbon radical, for instance an alkyl group, such as a tertiary butyl group. The aryl nuclei may consist of phenyl groups or of condensed ring systems. If there is more than one phenolic OH group, these groups may be attached to one aromatic nucleus, or distributed over several rings. Also phenols containing sulfur or nitrogen, as, for example, antioxidants of the thiobisphenol or aminophenol type, as well as the sulfur-containing phenolic compounds of the category described in the copending patent application, Serial No. 159,451, filed December 14, 1961, now Patent No. 3,234,177, are suitable for use in the present invention.

As phenolic antioxidants, phenols in which one or more ring hydrogen atoms have been replaced by a cyclic hydrocarbon radical, particularly cycloaliphatic, such as cyclohexyl, and isobornyl or norbornyl group are preferred. Examples of such phenols are 2,4-dimethyl-6-cyclohexylphenol,
2-methyl-4,6-dicyclohexylphenol,
4-methy-2,4-dicyclohexylphenol,
2,6-di-tert-butyl-4-cyclohexylphenol,
2,4,6-tricyclohexylphenol,
2-methyl-4,6-dicyclopentylphenol,
2,4,6-tricyclopentylphenol,
2-methyl-4,6-diisobornylphenol,
2,4-dimethyl-6-isobornylphenol,
2,4-dimethyl-4-isobornylphenol,
2,6-diisobornyl-4-methylphenol,
2,4,6-triisobornylphenol,
2-methyl-4,6-dinorbornylphenol,
4-methyl-2,6-dinorbornylphenol,
4-norbornyl-2,6-di-tert-butylphenol,
4-tert-butyl-2,6-dinorbornylphenol,
2,4-diethyl-6-norbornylphenol,
2,6-dimethyl-4-norbornylphenol,
2,4,6-trinorbornylphenol,
4,6-dinorbornyl-2-(4-thiahexadecyl)phenol and
1,12-bis(3,5-dinorbornyl-2-hydroxyphenyl)-4,9-dithiadodecane.

Very suitable phenols are also the polynuclear polyvalent phenols with a benzene ring, of which $n$ hydrogen atoms have been replaced by 3,5-dialkyl-4-hydroxybenzenyl group and 6-$n$-hydrogen atoms by alkyl groups, $n$ being equal to 3 or 4, as, for example, 1,3,5-trimethyl-2,4,6-tri(3,5-di-tert-butyl-4-hydroxybenzyl)benzene.

The quantities in which the stabilizers are used according to the invention are generally between 0.001 and 1% by weight for each of the stabilizers, calculated on the polymer to be stabilized.

The ratio by weight of hydroxyalkyl sulfide esters to phenolic antioxidants may vary within wide limits, for instance, between 100:1 and 1:10; preferably, however, the ester:phenol ratio is between 50:1 and 2:1.

To mix the stabilizers with the polymer any of the known methods may be utilized. Preferably, the stabilizers, or at least one or more of them, are added at the earliest possible stage, for example, during the working-up stage. If, for instance, the polymer is freed from the organic diluent used for the polymerization by a steam treatment or immediately before it. In certain cases it may be an advantage to apply only the most stable stabilizer(s) during the steam treatment and to add the less stable component(s) to the finished polymer. If so desired, after the steam treatment another quantity of one or more stabilizer(s) may be added to the finished polymer.

The process according to the invention may without any objection be applied to polymers to which calcium stearate has been added to render corrosive acids harmless. If to these polymer esters are added according to the present process, the ester groups of which are not stearic esters groups, processing of the resultant compositions may at most result in re-esterification of the admixed hydroxyalkyl sulfide esters to the corresponding stearic esters.

To illustrate the manner in which the invention may be carried out, the following examples are given. It is to be understood, however, that the examples are for the purpose of illustration and the invention is not to be regarded as limited to any of the specific conditions or constituents cited therein. Unless otherwise specified, parts are parts by weight.

*Example I*

This example illustrates that improved stabilization of polypropylene is achieved when the present antioxidant combination is employed. To further illustrate the improvement over prior antioxidants, several comparisons are being using lauric di-ester of bis(dihydroxyethyl) monosulfide. This ester is disclosed in Belgian patent, Serial No. 606,732, and it will be noted that such compound has less than three carbon atoms between the sulfur atom and the acyl groups and is a monosulfide. (See Experiments 3, 4, 8 and 9.)

Polypropylene prepared with application of a catalyst system composed of $TiCl_3$ and aluminum diethyl chloride, and which had an intrinsic viscosity of 2.7 (at 135° C. in decahydronaphthalene), was stabilized with the compounds listed in the Table I, the concentrations of which as referred to polymer are also recorded. The polymer thus stabilized was heated at atmospheric pressure in a few minutes to the temperature indicated in the table in a reaction vessel filled with pure oxygen, to which vessel an open mercury manometer had been connected.

By measuring the consumption of oxygen as a function of time, the induction period was determined, which is the time elapsing between the moment at which heating is initiated and the moment at which a rapid increase in oxygen consumption sets in.

The results of these measurements are also included in Table I.

TABLE I

| Exp. No. | Stabilizers and Quantities, as Referred to Polymer | | Temp. of Experiment, ° C. | Induction Period, minutes |
|---|---|---|---|---|
| | Thio Ester | Phenolic Antioxidant | | |
| 1 | $S-\left[(CH_2)_3-O-\overset{O}{\overset{\parallel}{C}}-C_{11}H_{23}\right]_2$ 0.257% w.=0.5 millimole/100 g | 2,4,6-trinorbornylphenol 0.0376% w.=0.1 mmole/100 g | 125 | $37\times10^4$ |
| 2 | $S-\left[(CH_2)_3-O-\overset{O}{\overset{\parallel}{C}}-C_{11}H_{23}\right]_2$ 0.257% w.=0.5 millimole/100 g | | 125 | $2.5\times10^3$ |
| 3 | $S-\left[(CH_2)_2-O-C-C_{11}H_{23}\right]_2$ 0.243% w.=0.5 mmole/100 g | 2,4,6-trinorbornylphenol 0.0376% w.=0.1 mmole/100 g | 125 | $4\times10^4$ |
| 4 | $S-\left[(CH_2)_2-O-C-C_{11}H_{23}\right]_2$ 0.243% w.=0.5 mmole/100 g | | 125 | $8\times10^2$ |
| 5 | $S-\left[(CH_2)_3-O-\overset{O}{\overset{\parallel}{C}}-C_{11}H_{23}\right]_2$ 0.195 mmole/100 g | 2-methyl-4,6-diisobornylphenol 0.1% w. | 160 | 1,700 |
| 6 | $S-\left[(CH_2)_3-O-\overset{O}{\overset{\parallel}{C}}-C_{11}H_{23}\right]_2$ 0.195 mmole/100 g | | 160 | 130 |
| 7 | $\left(S-\left[CH_2-\overset{H}{\underset{OH}{C}}-CH_2-O-\overset{O}{\overset{\parallel}{C}}-C_{9-11}H_{19-23}\right]_2\right)^a$ 0.195 mmole/100 g | 2-methyl-4,6-diisobornylphenol 0.1% w. | 160 | 2,540 |
| 8 | $S-\left[(CH_2)_2-O-\overset{O}{\overset{\parallel}{C}}-C_{11}H_{23}\right]_2$ 0.195 mmole/100 g | 2-methyl-4,6-diisobornylphenol 0.1% w. | 160 | 450 |
| 9 | $S-\left[(CH_2)_2-O-\overset{O}{\overset{\parallel}{C}}-C_{11}H_{23}\right]_2$ 0.195 mmole/100 g | | 160 | 70 |

[a] A thio ester mixture prepared by first esterifying epichlorohydrin with a mixture of saturated aliphatic monocarboxylic acids, prepared by the synthesis mentioned in the specification from a mixture of monoolefins with 8–10 carbon atoms with the aid of carbon monoxide and water, and then allowing the ester mixture thus produced to react with $H_2S$.

*Example II*

Polypropylene prepared as in Example I is stabilized with a stabilizer composition consisting of 0.25% of a hydroxylalkyl sulfide of the formula

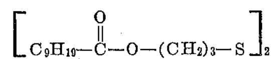

and 0.05% of 2,4-dimethyl-6-isobornylphenol. The induction period at 160° C. is greater than 2000 minutes.

*Example III*

The procedure of Example II is repeated except that the phenolic stabilizer portion is 2,4,6-tricyclopentylphenol. Related results are obtained.

*Example IV*

The procedure of Example II is substantially repeated wherein the polyolefin is ethylene and butene-1. Related results are obtained in each instance.

We claim as our invention:

1. A stabilized polyolefin comprising (A) a solid polymer of an olefin selected from the group consisting of ethylene, propylene and butene-1 produced by a low pressure polymerization process and (B) an inhibitor combination of (1) di-esters of bis(beta,gamma-dihydroxypropyl)monosulfide wherein only the gamma-hydroxyl groups are esterified with alpha-branched saturated aliphatic monocarboxylic acids having 8 to 30 carbon atoms and (2) a phenol in which at least one of the ring hydrogens has been replaced with a cyclic hydrocarbon radical selected from the group consisting of cyclohexyl, cyclopentyl, isobornyl and norbornyl radicals.

2. A stabilized polyolefin composition as in claim 1 wherein the phenolic compound is 2,4,6-trinorbornylphenol.

3. A stabilized polyolefin composition as in claim 1 wherein the olefin is propylene.

4. A stabilized polyolefin composition as in claim 1 wherein the phenolic compound is 2-methyl-4,6-diisobornyl phenol.

References Cited by the Examiner

UNITED STATES PATENTS

| | | | |
|---|---|---|---|
| 2,454,568 | 11/1948 | Pollack | 260—399 |
| 2,985,617 | 5/1961 | Salyer et al. | 260—45.7 |
| 3,180,850 | 4/1965 | Van Schooten et al. | 260—45.95 |
| 3,236,805 | 2/1966 | Caldo | 260—45.85 |

LEON J. BERCOVITZ, *Primary Examiner.*

M. J. WELSH, *Assistant Examiner.*